United States Patent
Peng et al.

(10) Patent No.: US 8,498,106 B2
(45) Date of Patent: Jul. 30, 2013

(54) DISK DRIVE MOUNTING APPARATUS

(75) Inventors: Wen-Tang Peng, Taipei Hsien (TW); Xin-Hu Gong, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 354 days.

(21) Appl. No.: 12/962,582

(22) Filed: Dec. 7, 2010

(65) Prior Publication Data
US 2012/0120589 A1    May 17, 2012

(30) Foreign Application Priority Data

Nov. 12, 2010    (CN) .......................... 2010 1 0542426

(51) Int. Cl.
*G06F 1/16*    (2006.01)

(52) U.S. Cl.
USPC .................................................... 361/679.33

(58) Field of Classification Search
USPC .................................................... 361/679.33
See application file for complete search history.

(56) References Cited

U.S. PATENT DOCUMENTS

| | | | | |
|---|---|---|---|---|
| 6,239,975 | B1 * | 5/2001 | Otis ............................... | 361/727 |
| 6,459,571 | B1 * | 10/2002 | Carteau ..................... | 361/679.33 |
| 6,621,692 | B1 * | 9/2003 | Johnson et al. ........... | 361/679.55 |
| 7,583,507 | B2 * | 9/2009 | Starr et al. ..................... | 361/727 |
| 7,626,812 | B2 * | 12/2009 | Chang et al. .............. | 361/679.33 |
| 2007/0230111 | A1 * | 10/2007 | Starr et al. ..................... | 361/685 |
| 2011/0007472 | A1 * | 1/2011 | Giardina et al. .......... | 361/679.33 |
| 2012/0113582 | A1 * | 5/2012 | Hirano et al. ............. | 361/679.33 |

* cited by examiner

*Primary Examiner* — Lisa Lea Edmonds
(74) *Attorney, Agent, or Firm* — Altis Law Group, Inc.

(57) ABSTRACT

A disk drive mounting apparatus includes a tray for receiving a disk drive, and a flexible retaining member. The retaining member has two ends mounted to the tray. The flexible retaining member is to sandwich the disk drive together with the tray.

17 Claims, 4 Drawing Sheets

DISK DRIVE MOUNTING APPARATUS

BACKGROUND

1. Technical Field

The present disclosure relates to a disk drive mounting apparatus.

2. Description of Related Art

An electronic device, such as a computer or server, usually includes disk drives, such as hard disk drives, compact disk read-only memory (CD-ROM) drives, and the like. However, the installation of these disk drives in the electronic device typically involves use of screws to attach the disk drives to drive brackets of the electronic device, which is complicated and labor-intensive.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The present disclosure, including the accompanying drawings, is illustrated by way of examples and not by way of limitation. It should be noted that references to "an" or "one" embodiment in this disclosure are not necessarily to the same embodiment, and such references mean at least one.

Figure 1:
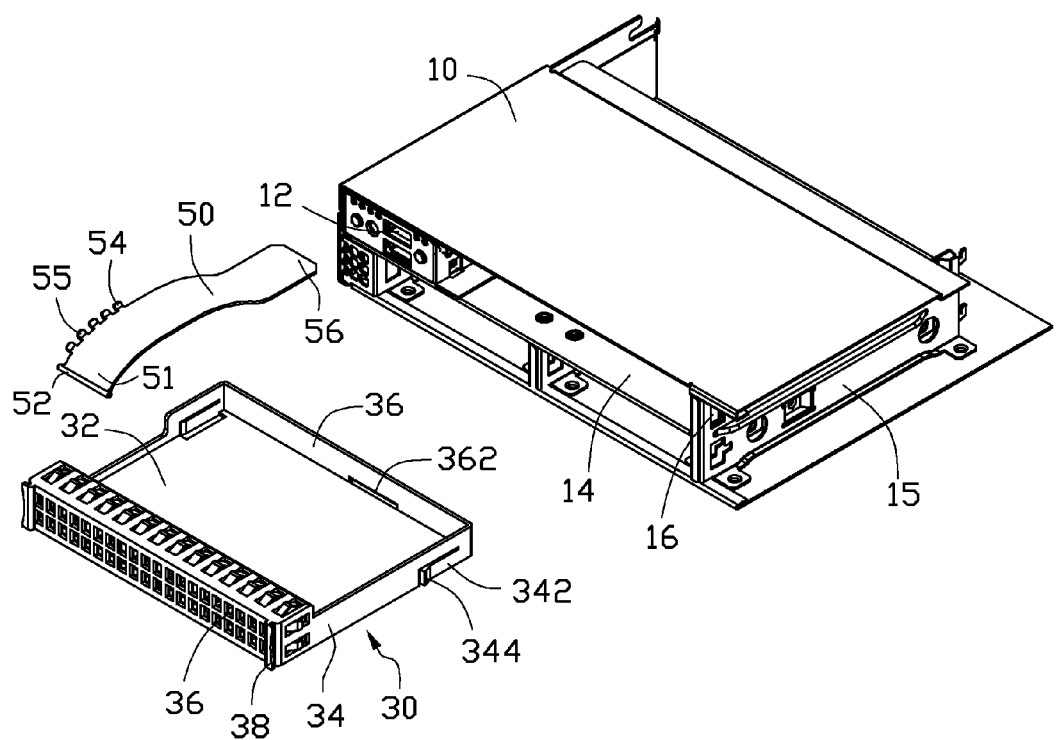
FIG. 1 is an exploded, isometric view of an exemplary embodiment of a disk drive mounting apparatus, including a housing, a movable tray, and a flexible retaining member.
Figure 2:
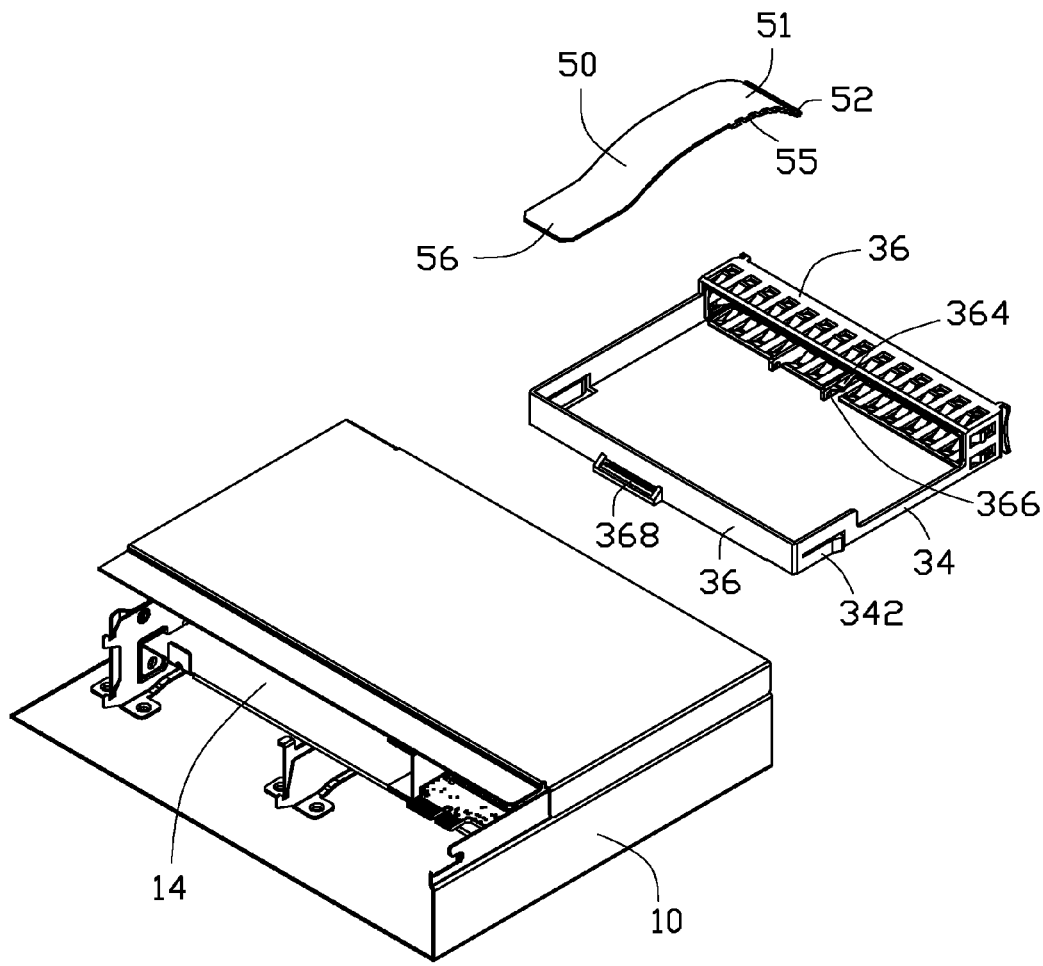
FIG. 2 is similar to FIG. 1, but viewed from another perspective.

Referring to FIGS. 1 and 2, a disk drive mounting apparatus in accordance with an exemplary embodiment is provided to fix two disk drives 70 (see FIG. 4), such as two universal serial bus (USB) flash disks. The mounting apparatus includes a housing 10, a movable tray 30 for receiving the disk drives 70, and a flexible retaining member 50. A receiving chamber 14 is defined in the housing 10 for receiving the tray 30. Two ports 12 are mounted in the housing 10 adjacent to the receiving chamber 14, corresponding to the disk drives 70. Two notches 16 are respectively defined in opposite sidewalls 15 bounding the receiving chamber 14. In the embodiment, the housing 10 is an enclosure of an electronic device, such as a computer or server. The receiving chamber 14 may be used to hold a hard disk drive or a compact disk read-only memory (CD-ROM) drive directly.

The tray 30 is box-shaped, and includes a rectangular base panel 32, two first side panels 34 substantially perpendicularly extending up from opposite ends of the base panel 32, and two second side panels 36 substantially perpendicularly extending up from opposite sides of the base panel 32. Two flexible elongated tongues 342 are respectively formed on the first side panels 34. A hook 344 protrudes from a distal end of each tongue 342, corresponding to the notch 16 of a corresponding sidewall 15 of the receiving chamber 14. A through hole 362 is defined in one of the second side panels 36, and two tabs 364 extend from the other second side panel 36. Two pivot holes 366 are respectively defined in the tabs 364. A block 368 is formed on the second side panel 36, adjacent to the through hole 362 and opposite to the other second side panel 36. Two grips 38 are formed on the other second side panel 36, respectively adjacent to the first side panels 34.

The retaining member 50 is a long strip with a first end 51 and a second end 56. Two pivot pins 52 are respectively formed at opposite sides of a first end 51 of the retaining member 50. A guide portion 54 with a number of flexible tabs 55, is formed at a side of the retaining member 50, adjacent to the pivot pins 52.

Figure 3:
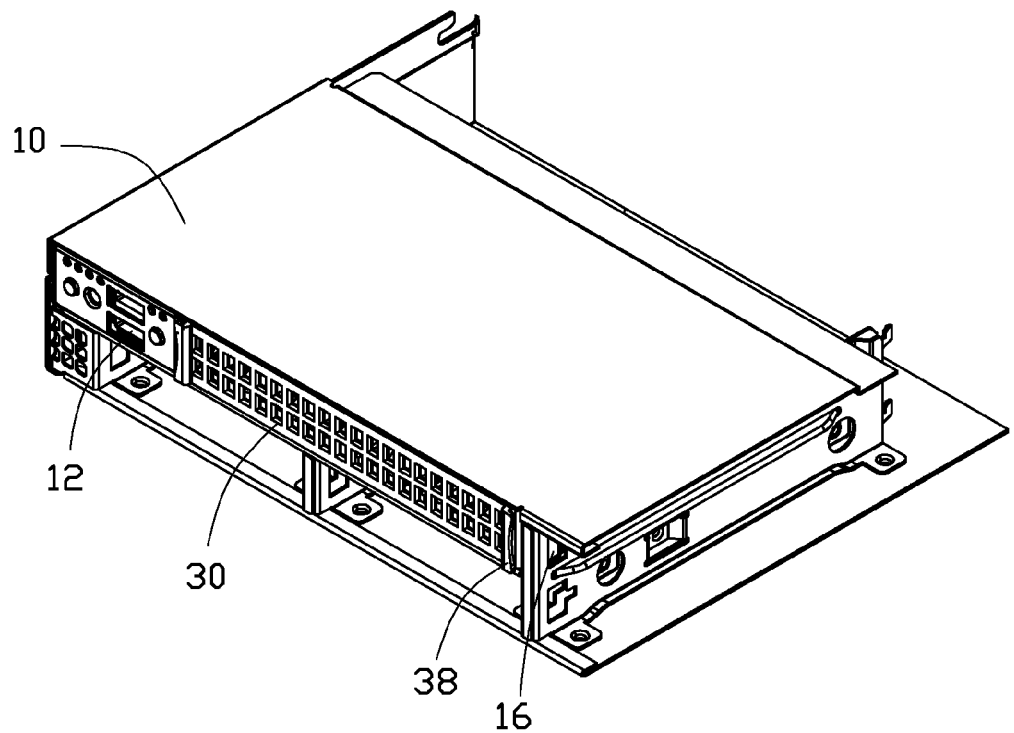
FIG. 3 is an assembled, isometric view of the disk drive mounting apparatus of FIG. 1.

Referring to FIG. 3, in assembly, the pivot pins 52 of the retaining member 50 are respectively pivotably engaged in the pivot holes 366 of the tabs 364 of the tray 30. A second end 56 of the retaining member 50 extends through the through hole 362 of the second side panel 36 of the tray 30, and is sandwiched between the second side panel 36 and the block 368. The tray 30 is pushed to slide into the receiving chamber 14 of the housing 10, and is fixed in the receiving chamber 14 with the hooks 344 of the tongues 342 passing by the corresponding notches 16 to resiliently abut against the sidewalls 15 of the receiving chamber 14.

Figure 4:
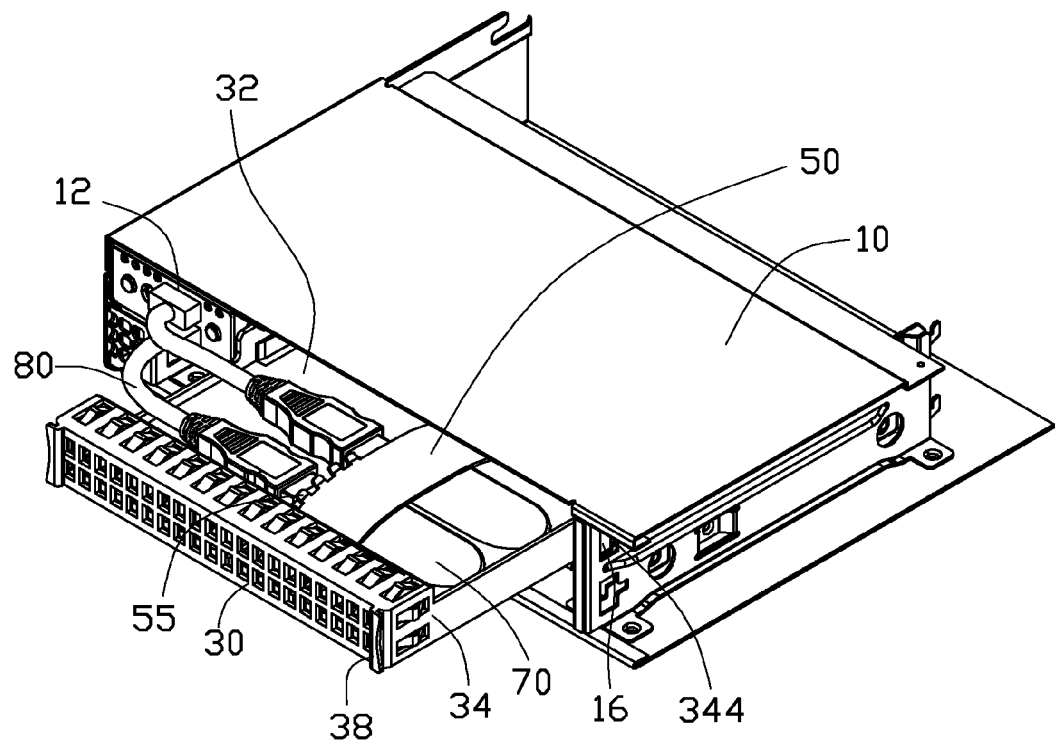
FIG. 4 is a use state view of the disk drive mounting apparatus of FIG. 3, together with two disk drives fixed in the tray by the retaining member and two cables connected between the disk drives and the housing.

Referring to FIG. 4, in use, the tray 30 is drawn out of the receiving chamber 14 by operating the grips 38. When the hooks 344 of the tongues 342 move to the notches 16 of the corresponding sidewalls 15 of the receiving chamber 14, the tongues 342 are restored to allow the hooks 344 to be respectively locked in the notches 16. Therefore, the tray 30 is positioned partially in the receiving chamber 14. The disk drives 70 are put on the base panel 32 of the tray 30 and inserted between the base panel 32 of the tray 30 and the retaining member 50 by guiding of the flexible tabs 55 of the guide portion 54. Thus, the disk drives 70 are simply and conveniently fixed by the retaining member 50. Two cables 80 are electrically connected between the ports 12 and the disk drives 70. Data transmission between the disk drives 70 and the housing 10 is accomplished.

It is to be understood, however, that even though numerous characteristics and advantages have been set forth in the foregoing description of embodiments, together with details of the structures and functions of the embodiments, the present disclosure is illustrative only and changes may be made in detail, especially in matters of shape, size, and arrangement of parts within the principles of the present disclosure to the full extent indicated by the broad general meaning of the terms in which the appended claims are expressed.

What is claimed is:

1. A disk drive mounting apparatus comprising:
   a tray configured for receiving at least one disk drive;
   a flexible retaining member having opposite ends mounted to the tray, the flexible retaining member being configured for sandwiching said least one disk drive together with the tray; and
   a housing, wherein a receiving chamber is defined in the housing, the tray is selective to be received completely or partially in the receiving chamber.

2. The disk drive mounting apparatus of claim 1, wherein the housing comprise at least one port, a cable is configured for being electrically connected between one of said least one port and one of said least one disk drive.

3. The disk drive mounting apparatus of claim 1, wherein two notches are defined in opposite sidewalls bounding the receiving chamber, two flexible tongues are formed on the tray to resiliently abut against the sidewalls bounding the receiving chamber.

4. The disk drive mounting apparatus of claim 3, wherein a hook protrudes from each of the tongues to be locked in the notch of the corresponding sidewall of the receiving chamber in response to the tray is received partially in the receiving chamber.

5. The disk drive mounting apparatus of claim 1, wherein two grips are formed on the tray to be operated to draw the tray out of the receiving chamber.

6. The disk drive mounting apparatus of claim 1, wherein two tabs are formed on the tray, two pivot holes are respectively defined the tabs, two pivot pins are formed at one of the ends of the retaining member and pivotably engaged in the pivot holes.

7. The disk drive mounting apparatus of claim 6, wherein a through hole is defined in the tray, a block is formed on the tray adjacent to the through hole, the other end of the retaining member extends through the through hole and is sandwiched between the tray and the block.

8. The disk drive mounting apparatus of claim 1, wherein the retaining member is a long strip.

9. The disk drive mounting apparatus of claim 8, wherein a guide portion with a number of flexible tabs, is formed at a side of the retaining member.

10. A disk drive mounting apparatus comprising:
a housing defining a receiving chamber therein and comprising a port at a side of the receiving chamber;
a tray configured for receiving a disk drive, and received partially in the receiving chamber;
a flexible retaining member having opposite ends fixed to the tray, configured for sandwiching the disk drive together with the tray; and
a cable configured for being electrically connected between the disk drive and the port.

11. The disk drive mounting apparatus of claim 10, wherein two notches are respectively defined in opposite sidewalls bounding the receiving chamber, two hooks respectively extend from opposite sides of the tray to engage in the notches.

12. The disk drive mounting apparatus of claim 11, wherein two flexible tongues are formed on the opposite sides of the tray, the hooks respectively extend from distal ends of the tongues.

13. The disk drive mounting apparatus of claim 10, wherein the retaining member is a long strip.

14. The disk drive mounting apparatus of claim 13, wherein one of the ends of the retaining member is pivotably mounted to a front side of the tray.

15. The disk drive mounting apparatus of claim 14, wherein the other end of the retaining member is mounted to a rear side of the tray.

16. A disk drive mounting apparatus comprising:
a tray configured for receiving at least one disk drive; and
a flexible retaining member having opposite ends mounted to the tray, the flexible retaining member being configured for sandwiching said least one disk drive together with the tray;
wherein two tabs are formed on the tray, two pivot holes are respectively defined the tabs, two pivot pins are formed at one of the ends of the retaining member and pivotably engaged in the pivot holes.

17. The disk drive mounting apparatus of claim 16, wherein a through hole is defined in the tray, a block is formed on the tray adjacent to the through hole, the other end of the retaining member extends through the through hole and is sandwiched between the tray and the block.

* * * * *